Jan. 12, 1971  K. E. OPAL  3,555,389
DIRECT CURRENT MOTOR CONTROL SYSTEM
Filed Oct. 10, 1968  2 Sheets-Sheet 2

INVENTOR
Kenneth E. Opal

By
Murray & Linkhauer
Attorneys

United States Patent Office 3,555,389
Patented Jan. 12, 1971

3,555,389
DIRECT CURRENT MOTOR CONTROL SYSTEM
Kenneth E. Opal, Oakmont, Pa., assignor to Power Control Corporation, Pittsburgh, Pa., a corporation of Pennsylvania
Filed Oct. 10, 1968, Ser. No. 766,498
Int. Cl. H02p 5/16
U.S. Cl. 318—345                 8 Claims

ABSTRACT OF THE DISCLOSURE

A direct current chopper for controlling the power supplied to a load through the use of a semiconductive controlled rectifier and a commutation capacitor which periodically discharges into the semiconductive controlled rectifier to cut it off, characterized in that in the event the semiconductive controlled rectifier fails to cut off or commutate, the capacitor goes through succeeding charging and discharging cycles until the semiconductive controlled rectifier cuts off.

BACKGROUND OF THE INVENTION

As is known, capacitor-type commutation circuits have been used in the past for direct current chopper circuits employing semiconductive controlled rectifiers. In such prior art circuits, the commutation capacitor is connected in shunt with the controlled rectifier and charges during the conduction period of the rectifier. In order to commutate or turn off the main semiconductive controlled rectifier, a switch in the shunt path, usually a second controlled rectifier, is closed whereby the capacitor discharges through the main rectifier in the reverse direction to cause it to cut off or commutate.

One difficulty with prior art chopper circuits of the type described above is that the commutation effect is not independent of load. That is, there is a maximum limitation on the load which must not be exceeded for proper operation. Furthermore, if the main semiconductive controlled rectifier in prior art choppers fails to commutate during one charging and discharging cycle of the commutation capacitor, the controlled rectifier continues to conduct; load current builds up; and all control over the system is lost. As will be understood, this is particularly disadvantageous in cases where a chopper is utilized to control an electrically driven vehicle. Once the main semiconductive controlled rectifier fails to commutate, load current to the vehicle drive motor surges; control over the vehicle is lost; and the vehicle can be stopped only by tripping a main contactor or possibly by failure of a fuse.

There is another disadvantage of conventional semiconductive controlled rectifier chopper circuits as applied to vehicles. Such vehicles employ direct current drive motors supplied with battery power. Naturally, the battery must be charged from time-to-time. As the battery discharges during use, a point is reached where the voltage output is sufficient to drive the motor, but insufficient to charge the commutation capacitor to the point where it will cut off the main semiconductive controlled rectifier. Consequently, vehicles utilizing such prior art chopper circuits cannot employ the full capability of the battery and require more frequent charging of the battery than would otherwise be the case.

SUMMARY OF THE INVENTION

As an overall object, the present invention provides a direct current chopper circuit employing a semiconductive controlled rectifier and incorporating positive commutation action. As will be seen, the positive commutation action allows the main semiconductive controlled rectifier to fail to commutate during one cycle of a commutation capacitor and yet be able to commutate on the next or succeeding cycles. This permits the semiconductive controlled rectifier to be operated under high overload conditions and minimizes the size of the commutation capacitor required.

Another object of the invention is to provide a direct current chopper circuit of the type described wherein the energy stored in the commutation capacitor increases with increasing load current. This gives the circuit a greater commutation capability as the load requires more current, thereby extending the control range of the circuit.

Still another object of the invention is to provide a direct current chopper circuit employing a semiconductive controlled rectifier for use in battery operated vehicles and the like, wherein the useful life of the battery before recharging is extended.

In accordance with the invention, a direct current load, such as a motor, is connected in series with a main semiconductive controlled rectifier across the output terminals of a source of direct current voltage. In shunt with the first semiconductive controlled rectifier is a current path including an inductor in series with, and intermediate, a capacitor and a second semiconductive controlled rectifier. The junction of the aforesaid commutation capacitor and inductor is connected through a second inductor and a third switch, also a semiconductive controlled rectifier, to the side of the load opposite the main rectifier.

In the operation of the circuit, the first and third rectifiers are fired simultaneously, thereby causing current to flow through the load while at the same time causing the commutation capacitor to charge. Thereafter, the third rectifier is cut off and the second fired to discharge the capacitor through the main rectifier, thereby causing it to cut off. However, should the main rectifier fail to commutate, and because of the resonant nature of the circuit, the capacitor will again charge to approximately twice the battery voltage. This cycle is repeated until the main rectifier is eventually cut off, or the complete control is shutdown by auxiliary protection circuitry, not shown.

The above and other objects and features of the invention will become apparent from the following detailed description taken in connection with the accompanying drawings which form a part of this specification, and in which.

Figure 4:
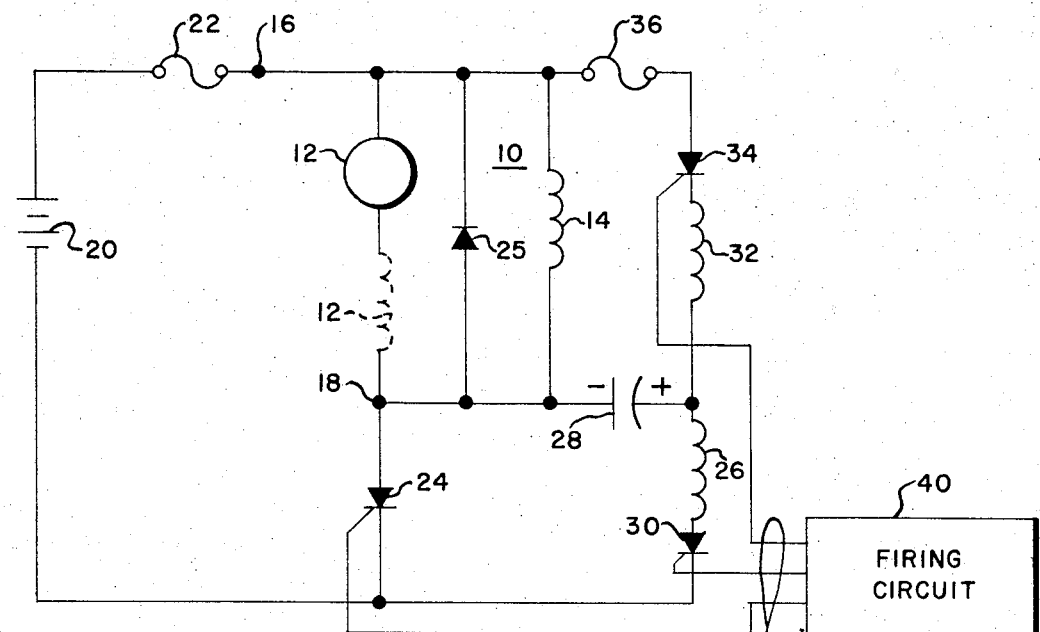
Figure 3:
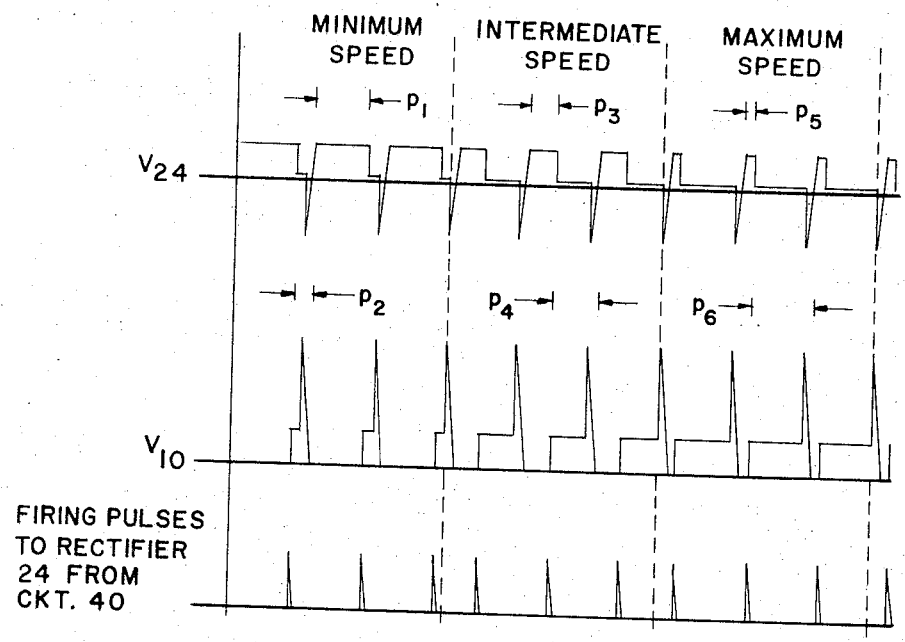

FIG. 3 comprises waveforms of the voltage applied to the motor and the main semiconductive controlled rectifier of the chopper for varying motor speeds; and FIG. 4 is an illustration of the invention as applied to a shunt field or compound field direct current motor.

Figure 1:
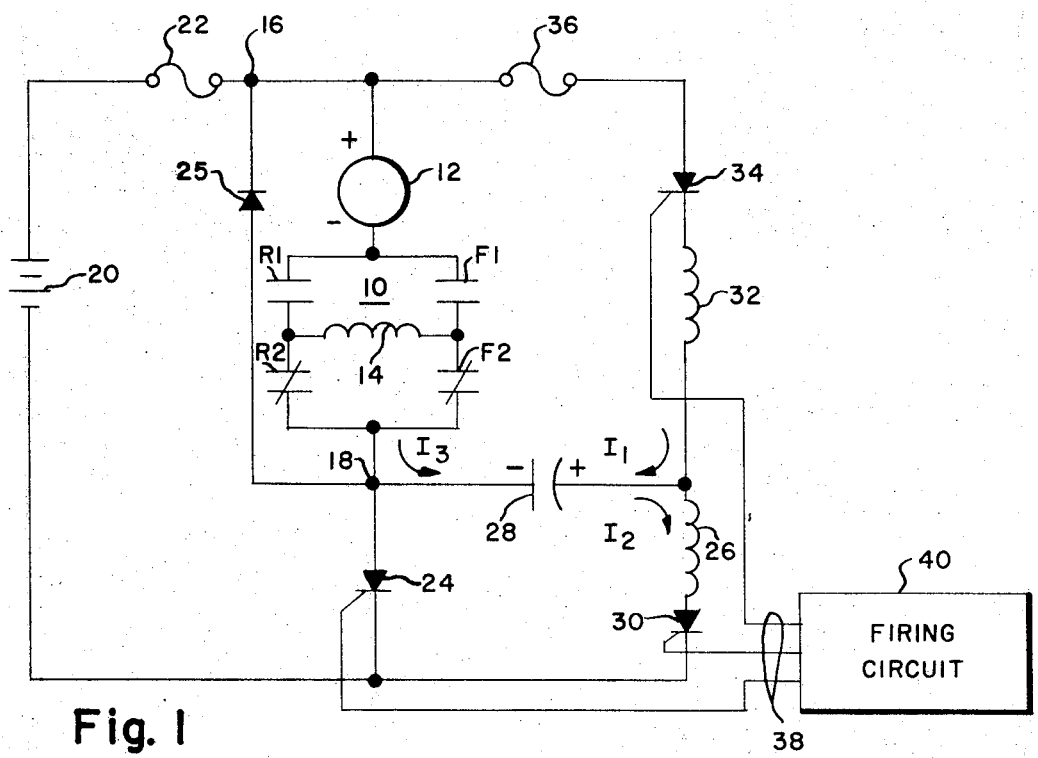
FIG. 1 is a schematic circuit diagram of one embodiment of the basic chopper circuit of the invention as applied to a series field direct current motor.

For purposes of convenience, the term "thyristor" will be used hereinafter to describe the semiconductive controlled rectifiers employed in the circuit. With reference to FIG. 1, the circuit shown includes a direct current motor, generally indicated by the reference numeral 10, having an armature 12 and a series field winding 14. As is usual, the motor 10 is provided with forward contacts F1 and F2 and reversing contacts R1 and R2. Contacts F1 and F2 are connected to an energizing coil, not shown, such that when the forward coil is energized, normally open contacts F1 will close and normally closed contacts F2 will open. This will then permit current to flow from one input terminal 16 of the motor 10 through armature 12, contacts F1, field winding 14 and contacts R2 to the other input terminal 18 of the motor. Under these circumstances, the motor is rotating in the forward direction. In order to cause the motor to reverse, the coil for contacts F1 and F2 is deenergized and that for contacts R1 and R2 is energized, thereby closing normally open contacts R1 and opening normally closed contacts R2. Under these circumstances, current will now flow from terminal 16 through armature 12, contacts R1, field winding 14, and contacts F2 to input terminal 18.

A source of direct current driving potential, such as battery 20, is provided for the motor 10. As shown, the positive terminal of battery 20 is connected through a main fuse 22 to input terminal 16. The negative terminal of battery 20 is connected through a main thyristor 24 to input terminal 18. Connected in shunt with the main thyristor 24 is a series current path including a limiting inductor 26 intermediate a commutation capacitor 28 and a commutation thyristor 30. The junction of capacitor 28 and inductor 26 is connected through charging inductor 32, charging thyristor 34 and fuse 36 to the input terminal 16.

As is known, the thyristors 24, 30 and 34 are similar in operation to thyratrons. Each is provided with an anode, a cathode and a gate electrode, the gate electrodes being connected through leads 38 to a firing circuit 40 which produces firing pulses on the leads 38 to initiate conduction in the thyristors in timed sequence. Once the thyristors are rendered conductive by application of firing pulses to their gate electrodes, the gate electrodes lose control, and the thyristors must hereafter be turned off by applicaion of a reverse bias.

Under normal conditions, the circuit operates as follows: Initially, thyristors 24 and 34 are fired simultaneously. This permits motor current to flow through the main thyristor 24 and also causes capacitor 28 to charge through charging thyristor 34, charging inductor 32 through the main thyristor 24, the charging current being identified as $I_1$. As will be understood, charging inductor 32 and capacitor 28 form a resonant circuit. When thyristors 24 and 34 are fired simultaneously, the resonant circuit "rings" and charges capacitor 28 to twice the battery voltage with the polarity shown in FIG. 1. This action also serves to cut off or commutate thyristor 34 in one-half the resonant period of elements 28 and 32. That is, the voltage on the cathode of thyristor 34 will first swing negative and, due to the resonant circuit effect, will thereafter swing in the positive direction to the point where the thyristor 34 is cut off.

A this point, capacitor 28 is charged to twice the battery voltage and thyristor 34 is cut off. To commutate the main thyristor 24, the commutation thyristor 30 is fired by circuit 40. This connects the commutation capacitor 28 across the main thyristor 24 and forces current, $I_2$, through the main thyristor 24 in the reverse direction, causing the unit to cut off or commutate. When the thyristodr 24 is cut off, reverse current from motor 10 due to the inductance of its windings flows through a freewheeling diode 25. Limiting inductor 26 limits the rate of rise of current through the main thyristor 24 in the reverse direction. Thereafter, capacitor 28 charges in the opposite direction through the motor armature 12, series field 14, limiting inductor 26 and commutation thyristor 30, the charging current being identified as $I_3$. These elements also form a resonant circuit which charges the capacitor 28. That is, the inductance of the motor, limiting inductor 26 and capacitor 28 form the resonant components. The commutation thyristor 30 is cut after one-quarter cycle of the resonant frequency of elements 26, 28 and the motor inductance.

One cycle has now been completed with thyristor 24 commutated and thyristor 30 also off; and the circuit is now ready for the next turn-on pulses from circuit 40 of the main thyristor 24 and charging thyristor 34. Under normal operation, this sequence is repeated at a frequency of approximately 150 cycles per second. The average voltage to the motor 10 and, hence, its speed can be controlled by varying the phase of the firing pulses to the main thyristor 24 via firing circuit 40.

The operation of the circuit can perhaps best be explained by reference to FIG. 2 where the waveform $V_{24}$ represents the voltage at the anode of thyristor 24 with respect to ground. The battery voltage from battery 20 is indicated on FIG. 2 by the broken line 42. Initially, the voltage $V_{24}$ at the anode of thyristor 24 is equal to the battery voltage with the thyristor being cut off. At time $t_1$, however, both of the thyristors 24 and 34 fire. Consequently, the voltage $V_{24}$ at the anode of thyristor 24 drops. At the same time, the voltage $V_{34}$ on the cathode of thyristor 34 rises in the positive direction; while the voltage $V_{28}$ across capacitor 28 begins to rise along the slope 44. The voltage $V_{30}$ on the anode of commutation thyristor 30 falls abruptly at time $t_1$ and then rises in the positive direction when the thyristor cuts off along the general slope 45 as capacitor 28 charges with the polarity shown in FIG. 1. The motor voltage $V_{10}$ appearing between input terminals 16 and 18 rises abruptly at time $t_1$; and motor current $I_{10}$ begins to rise.

Figure 2:
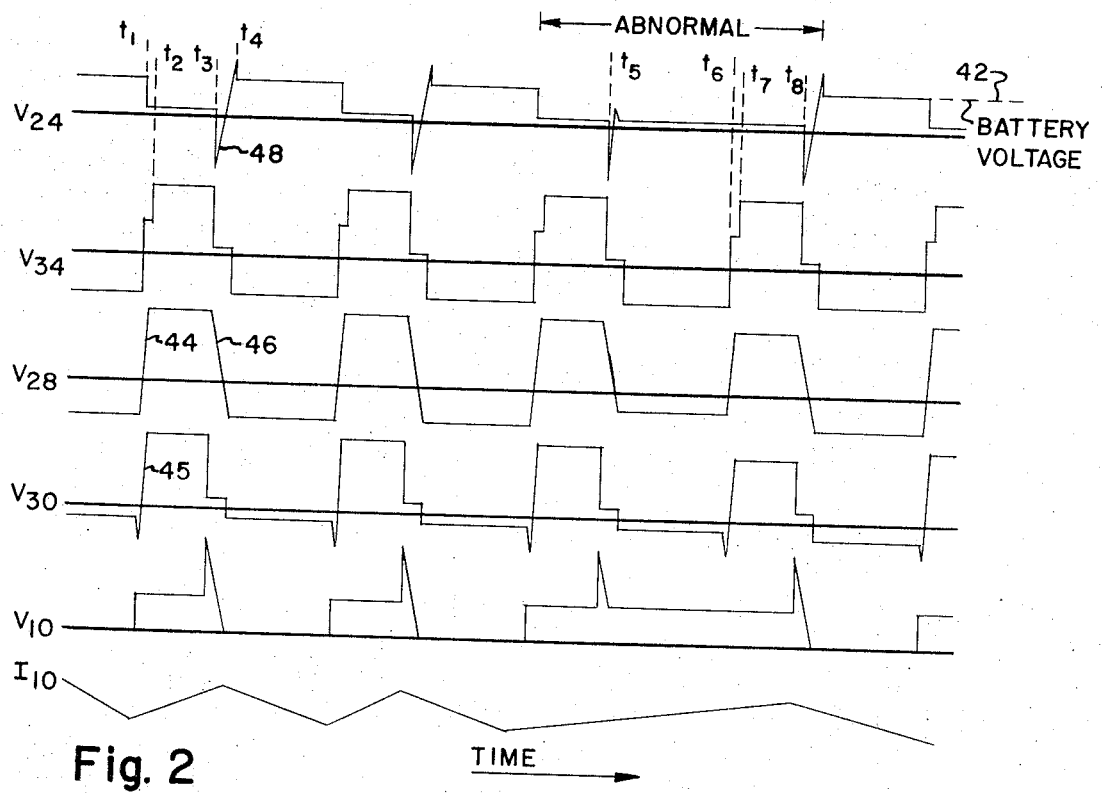
FIG. 2 illustrates waveforms appearing at various points in the circuit of FIG. 1.

At time $t_2$ shown in FIG. 2, charging thyristor 34 cuts off and the voltage $V_{34}$ of the cathode of this thyristor becomes the same as that across the capacitor 28, or twice the battery voltage. Thyristor 24 will continue to conduct until time $t_3$ is reached, whereupon the commutation thyristor 30 is fired. At this time, voltages $V_{30}$ and $V_{34}$ drop; and the voltage $V_{28}$ across capacitor 28 falls along the slope 46 as the capacitor discharges and forces a reverse current through the main thyristor 24, this reverse current being reflected as a negative-going spike 48 in waveform $V_{24}$. After the capacitor 28 has discharged to cut off thyristor 24, it begins to charge with the opposite polarity as indicated by waveform $V_{28}$. Finally, at time $t_4$ with the thyristor 24 cut off, the voltage on its anode, $V_{24}$, again assumes the battery voltage and the current $I_{10}$ through the motor decreases.

The waveforms given in FIG. 2 are for a single motor speed. The appearance of waveforms $V_{24}$ and $V_{10}$ for various motor speeds is shown in FIG. 3. At minimum motor speed, the "OFF" period $P_1$ of the thyristor 24 is at a maximum while the "ON" period of the motor, $P_2$, is at a minimum. In effect, voltage is being applied to the motor 10 in the form of pulses; and with the narrow width pulses of period $P_2$, very little current flows through the motor. At intermediate speeds, the "OFF" period $P_3$ of the thyristor 34 decreases while the "ON" period $P_4$ of the motor increases. Finally, at maximum speed, the "OFF" period $P_5$ of the thyristor is at a minimum while the "ON" period $P_6$ of the motor is at a maximum. The period of conduction of the thyristor 24 and, hence, the width of the voltage pulses applied to the motor 10 are controlled by the firing circuit 40 in accordance with well-known procedures. In the case of an electric vehicle, for example, the firing circuit could be controlled by a foot-actuated accelerator which, when depressed, will vary the phase position of the firing pulses to thereby decrease the "OFF" periods of the thyristor 24 and increase the average voltage to the motor.

The foregoing sequence of operations between times $t_1$ and $t_4$ in FIG. 2 will occur in repeated cycles, assuming that the main thyristor 24 is cut off when capacitor 28 first discharges. However, if an abnormal condition should occur at time $t_5$ shown in FIG. 2, such as the main thyristor 24 failing to commutate due to an overtemperature condition, full battery voltage is applied to the motor as shown by waveform $V_{10}$. Under these circumstances, the commutation thyristor 30 still cuts off as indicated by waveform $V_{30}$ as the current through capacitor 28 and inductor 26 goes to zero. The circuit is now in a condition where thyristor 24 remains ON (whereas it should be OFF), thyristors 34 and 30 are OFF, and capacitor 28 is discharged. If this condition were to persist, as it would in prior art circuits, the current through the motor would become excessive and all control over the system would be lost.

At time $t_6$ in FIG. 2, turn-on pulses are again applied to thyristors 24 and 34 by circuit 40. The one pulse has no effect on thyristor 24 since it is already ON. The other pulse, however, does turn on thyristor 34 which causes the resonant circuit, formed by inductor 32 and capacitor 28 to "ring" and charge capacitor 28 to twice the battery voltage. Thyristor 34 again turns off at time $t_7$ such that the circuit is again ready to commutate the main thyristor 24. Finally, at time $t_8$ shown in FIG. 2, thyristor 30 will again fire; and in this case the charge on capacitor 28 is sufficient to cut off thyristor 24, whereupon the voltage $V_{24}$ on the anode of the main thyristor 24 rises and the normal cycle is repeated.

In FIG. 2, it is assumed that under the abnormal conditions given, it was necessary to charge the commutation capacitor 28 only twice in order to cut off the main thyristor 24. However, should the commutation thyristor 24 fail to cut off after the second cycle, the capacitor will charge as many times as necessary until the thyristor 24 is commutated OFF or the complete control is shutdown by auxiliary protection circuitry. This feature enables the system to be operated under high overload conditions and still be capable of recovering should the main thyristor 24 fail to commutate and the overload condition cease.

Thus, should the main thyristor 24 remain ON, the capacitor 28 will still build up to approximately twice the battery voltage. When the main thyristor 24 is commutated OFF, capacitor 28 charges to an opposite polarity through a resonant circuit formed by the motor inductance, capacitor 28 and limiting inductor 26. It can be shown that the value of the reverse voltage to which capacitor 28 charges is proportional to the amount of current flowing through the motor inductance when thyristor 30 is fired. When the charging thyristor 34 is fired, the resonant circuit formed by inductor 32 and capacitor 28 rings and transfers the energy which has been stored in the capacitor 28 from the previous commutation cycle. This causes the capacitor voltage polarity to reverse. The capacitor is now charged to greater than two times the battery voltage and is ready for an extra commutation cycle. The greater the energy stored in capacitor 28 due to increased motor current, the greater will be the voltage to which the capacitor will be charged in the opposite direction when preparing it for commutation. The effect, therefore, is somewhat similar to that of a pendulum.

Although the foregoing description of the charging and discharging cycles of capacitor 28 was described as if it occurred slowly, it must be remembered that even under the most adverse circumstances, it will take only a small number of charging cycles of capacitor 28 to cause the thyristor 24 to fire. Since the commutation frequency is approximately 150 cycles per second, the delay can be measured in milliseconds; and the operator of an electrically powered vehicle, for example, would not even be aware of the fact that the main thyristor 24 had failed to fire.

With reference now to FIG. 4, an application of the invention to a shunt wound direct current motor is shown. The circuit is the same as that of FIG. 1 except, of course, that the field winding 14 is in shunt with the armature 12 rather than in series therewith, and the free wheeling diode 25 is connected across the shunt field. The operation of the circuit in this case is the same as that described in connection with FIG. 1; and, if desired, a second series winding 14' may be added to the motor to make it the compound type, in which case the operation is still the same as that described above in connection with FIG. 1.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a control system for a direct current motor having a pair of input terminals, a conductor for connecting one of said input terminals to an output terminal of a source of direct current power, means including a first semiconductor controlled rectifier for connecting the other input terminal of the motor to the other output terminal of the source of direct current power, a first current path including an inductor in series with and intermediate a capacitor and a second semiconductive controlled rectifier, said first current path being connected in shunt with said first semiconductive controlled rectifier, and a second current path including a second inductor in series with a third semiconductive controlled rectifier connecting the junction of the capacitor and inductor in said first current path to said one input terminal of the motor.

2. The control system of claim 1 wherein each of said semiconductive controlled rectifiers has an anode, a cathode and a control electrode, and including circuit means for simultaneously applying firing pulses to the control electrodes of the first and third controlled rectifiers to apply said source of direct current power across the input terminal of the motor while charging said capacitor.

3. The control system of claim 2 wherein said third rectifier cuts off after said capacitor is charged, and said circuit means thereafter applies a firing pulse to the control electrode of said second semiconductive controlled rectifier to discharge said capacitor through said first semiconductive controlled rectifier and thereby cut it off.

4. The control system of claim 1 including a firing circuit for applying firing pulses to said first, second and third semiconductive controlled rectifiers in timed sequence.

5. The control system of claim 1 wherein said direct current motor includes a field winding connected in series with the armature of the motor.

6. The control system of claim 1 wherein said motor includes a field winding connected in shunt with the motor armature.

7. The control system of claim 1 including a free wheeling diode connected between the input terminals of said motor.

8. The control system of claim 1 characterized in that said capacitor charges while said first and third controlled rectifiers are conducting in the forward direction and discharges while said second controlled rectifier conducts in the forward direction.

References Cited

UNITED STATES PATENTS

| | | | |
|---|---|---|---|
| 3,365,640 | 1/1968 | Gurwicz | 318—345 |
| 3,411,065 | 11/1968 | Tedd | 318—341 |
| 3,419,778 | 12/1968 | Gurwicz | 318—345 |
| 3,428,881 | 2/1969 | Cote | 318—341 |

ORIS L. RADER, Primary Examiner

THOMAS LANGER, Assistant Examiner